(12) United States Patent
Abry et al.

(10) Patent No.: US 12,708,872 B2
(45) Date of Patent: Aug. 18, 2026

(54) FLUIDS, SOLIDS AND HEAVY COMPONENT REMOVAL FROM RECLAIMER PROCESS LIQUID STREAMS

(71) Applicant: CCR Technologies, Ltd., Calgary (CA)

(72) Inventors: Raymond G. F. Abry, Calgary (CA); Marc Deremiens, Calgary (CA); Di Tian, Calgary (CA); Adrian Ail, Spring, TX (US)

(73) Assignee: Axens, Ruel-Malmaison (FR)

( * ) Notice: Subject to any disclaimer, the term of this patent is extended or adjusted under 35 U.S.C. 154(b) by 371 days.

(21) Appl. No.: 18/246,180

(22) PCT Filed: Oct. 15, 2021

(86) PCT No.: PCT/US2021/055259
§ 371 (c)(1),
(2) Date: Mar. 21, 2023

(87) PCT Pub. No.: WO2022/082028
PCT Pub. Date: Apr. 21, 2022

(65) Prior Publication Data

US 2023/0365435 A1 Nov. 16, 2023

Related U.S. Application Data

(60) Provisional application No. 63/092,538, filed on Oct. 16, 2020.

(51) Int. Cl.
*B01D 53/14* (2006.01)
*C02F 1/38* (2023.01)
(Continued)

(52) U.S. Cl.
CPC ............ *B01D 53/1425* (2013.01); *C02F 1/38* (2013.01); *C02F 1/66* (2013.01);
(Continued)

(58) Field of Classification Search
CPC ................ B01D 53/1425; B01D 53/96; B01D 2252/2023; B01D 2252/204; C02F 1/38; C02F 1/66; C02F 1/02; C02F 2103/18; C02F 2209/06; C02F 2301/043; C02F 2301/046; C02F 2101/203; C02F 2101/34;
(Continued)

(56) References Cited

U.S. PATENT DOCUMENTS 4,133,650 A * 1/1979 Germerdonk ........... C01B 17/60
423/242.3
4,315,815 A 2/1982 Gearhart
(Continued)

FOREIGN PATENT DOCUMENTS

CN 106477768 3/2017
CN 106630269 5/2017
CN 109534542 3/2019

*Primary Examiner* — Liam Royce
(74) *Attorney, Agent, or Firm* — Werner IP Law, P.C.

(57) ABSTRACT

A process for removing solids/sludge, unwanted liquids and heavy components from processing liquids. The process involving adjusting the pH of the feed stream comprising processing liquids, water, and one or more contaminants and introducing the stream into a solids/liquids/liquids centrifuge. The solids removal process being incorporated into a processing liquid reclaiming/recovery process.

12 Claims, 3 Drawing Sheets

(51) Int. Cl.
*C02F 1/66* (2023.01)
*C02F 103/18* (2006.01)

(52) U.S. Cl.
CPC ................ *B01D 2252/2023* (2013.01); *B01D 2252/204* (2013.01); *C02F 2103/18* (2013.01); *C02F 2209/06* (2013.01); *C02F 2301/043* (2013.01); *C02F 2301/046* (2013.01)

(58) Field of Classification Search
CPC ............ C02F 2101/101; C02F 2101/32; C02F 2101/322
See application file for complete search history.

(56) References Cited

U.S. PATENT DOCUMENTS 4,770,747 A 9/1988 Muller
5,152,887 A 10/1992 Beasley et al.
5,158,649 A 10/1992 Beasley et al.
5,389,208 A 2/1995 Beasley et al.
5,441,605 A 8/1995 Beasley et al.
5,993,608 A 11/1999 Abry et al.
6,113,786 A * 9/2000 Burke .................... C02F 3/286 210/603
6,508,916 B1 1/2003 Razzaghi et al.
7,198,722 B2 4/2007 Hussain
9,205,370 B2 12/2015 Trofimuk et al.
9,266,055 B2 * 2/2016 Königsson ......... B01D 53/1425
10,213,705 B2 2/2019 Abry et al.
2008/0070816 A1 3/2008 Martin de Julian et al.
2009/0169452 A1 * 7/2009 Constantz ............... C01F 11/18 423/220
2009/0259060 A1 10/2009 Cantrell et al.
2010/0326840 A1 12/2010 Hisshion et al.
2012/0199524 A1 8/2012 Bly, Jr. et al.
2022/0281764 A1 * 9/2022 Nicholson ............. C02F 1/5272

* cited by examiner 105
110
100
120
130
132
211
152
158
140
166
134
170
164
150
160
162
196
188
172
173
168
154
154
154
178

132
105
130
140
120
110
188
180
186
133
194
209
208
182
204
200
100
192
154
234
184
190
178
196
154
100

105
110
120
130
132
133
134
140
150
152
154
158
160
162
164
166
168
170
172
173
178
180
182
184
188
190
192
194
196
200
204
206
208
209
211
234
100

FLUIDS, SOLIDS AND HEAVY COMPONENT REMOVAL FROM RECLAIMER PROCESS LIQUID STREAMS

CROSS REFERENCE TO RELATED APPLICATION

This application claims is a national phase application of PCT/US2021/055259 filed on Oct. 15, 2021, which in turn claims priority to U.S. Application No. 63/092,538 filed on Oct. 16, 2020, the disclosures of which are incorporated herein by reference for all purposes.

FIELD OF THE INVENTION

The present invention relates to a process for recovering a processing liquid and, more particularly, to a process of reducing solids/sludge, unwanted liquids and heavy components during that recovery.

BACKGROUND OF THE INVENTION

There are numerous processes wherein a liquid, hereinafter referred to as a processing liquid, which can comprise one or more components, is used in such a fashion that it becomes contaminated with, or contains, various components, some of which are more volatile than the processing liquid and some of which are less volatile and can be dissolved in the processing liquid or insoluble in the processing liquid. Usually, the components in the processing liquid are contaminants, although some may be desirable recovered components, depending on the process in which the processing liquid is used. It will be appreciated that the processing liquid is generally expensive and furthermore cannot generally be disposed of in an environmentally suitable manner. Accordingly, there are various recovery or reclaiming processes to separate the processing liquid from the insoluble liquids, the less volatile and more volatile components so that the processing liquid can be reused in the process or simply recovered in a substantially pure state for reuse or other uses. The goal of all processes to recover or clean used processing liquids is to render the cleaned processing liquid suitable for further use in the process from which it came.

U.S. Pat. Nos. 4,315,815; 4,770,747; 5,152,887; 5,158,649; 5,389,208; and 5,441,605, all of which are incorporated herein by reference for all purposes, all deal with processes and apparatus for reclaiming and/or concentrating waste aqueous solutions of gas treating chemicals. U.S. Pat. Nos. 5,993,608; 6,508,916; 9,205,370; and 10,213,705, all of which are incorporated herein by reference for all purposes, disclose and claim processes for recovering processing liquids wherein components less volatile than the processing liquid such as dissolved and/or suspended solids are removed from the processing liquid under conditions that prevent any substantial degradation of the processing liquid and provide for the recycle water, refined processing liquid or a mixture thereof back to the front end of the process.

The prior art systems for recovering processing liquids often utilize recycle or recirculation streams of separator residue to increase the efficiency of the process. One of the major issues with this process is that solids present in the feed stream buildup in the bottoms recirculation loops. The present invention describes a process for recovery of processing liquid in which the solids and/or sludges are removed from the bottoms recirculation loop while the reclaiming process is underway. The present invention also provides a process for the removal of unwanted solid and insoluble liquid as pre-treatment steps to a reclaiming process.

SUMMARY OF THE INVENTION

In one aspect, the present invention relates to a process for removing heavy components such as solids from a recycle/recirculation stream forming part of a cleaning and recovery process to recover a processing fluid from a feed stream.

In another aspect, the present invention relates to a process for removing insoluble liquids, solids and/or sludges from feed stream(s) comprising a desired processing liquid.

In yet another aspect, the present invention relates to a process for pretreating a feed steam of contaminated processing liquid before a reclaiming/recovery process.

In still a further aspect, the present invention relates to a process for pretreating a contaminated processing liquid before a reclaiming/recovery process and for removing insoluble liquids, solids and/or sludges from stream(s) entering the recycle/recirculation system of the thermal reclaiming/recovery process.

These and further features and advantages of the present invention will become apparent from the following detailed description, wherein reference is made to the figures in the accompanying drawings.

DETAILED DESCRIPTION OF PREFERRED EMBODIMENTS

Figure 1:
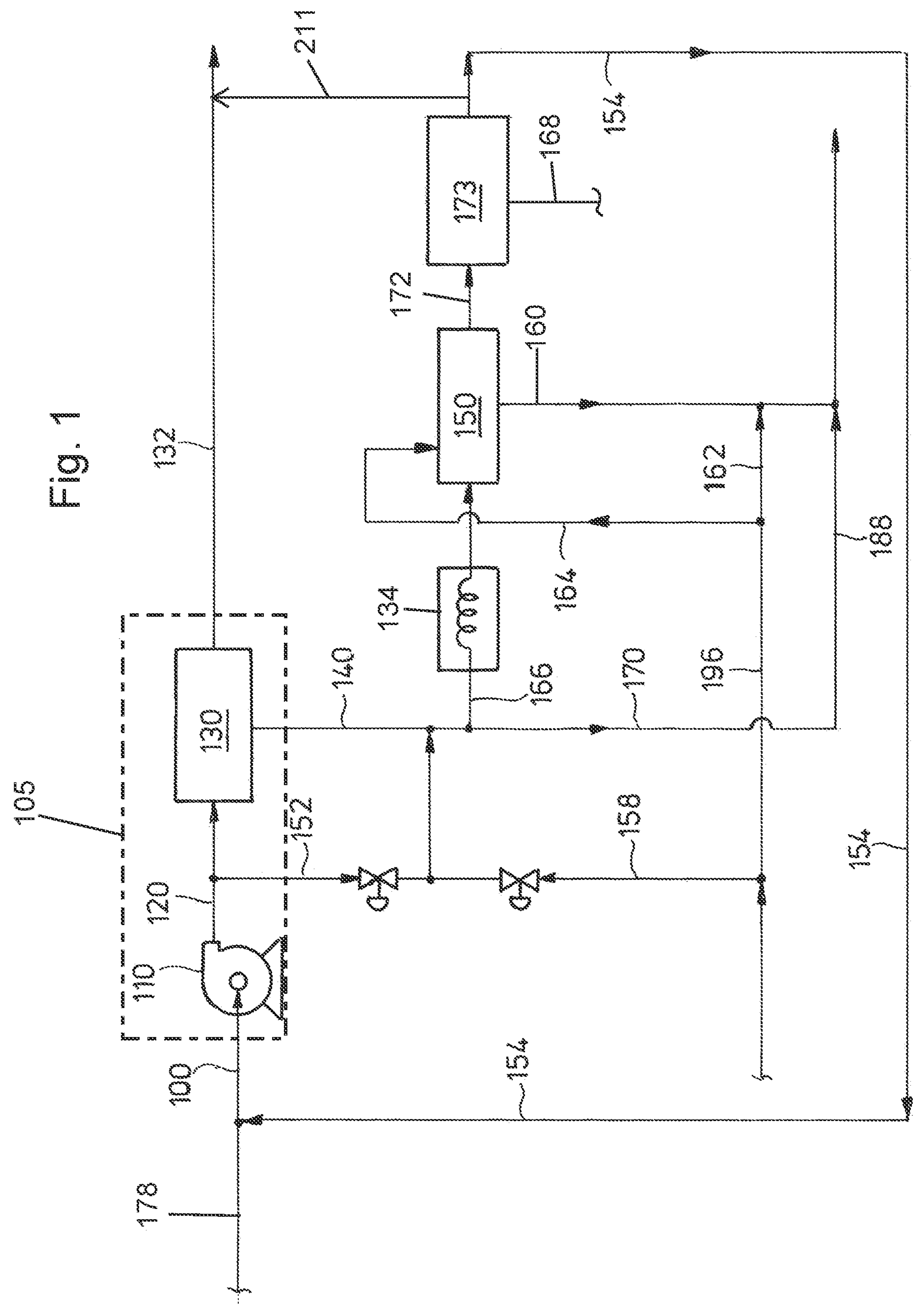
FIG. 1 is a schematic, flow diagram of one embodiment of the reclaiming process of the present invention.

The term "processing liquid" as used herein refers to any aqueous or non-aqueous liquids that can contain one or more components and includes, without limitation, chemicals used in gas production, gas processing, refining, petrochemical processes, carbon capture, utilization and storage, completion fluids, and heat transfer fluids. Particular examples of processing liquids include, but are not limited to gas treating chemicals such as alkanolamines, e.g., monoethanolamine (MEA), diethanolamine (DEA), methyldiethanolamine (MDEA); blends of these, as hindered amines, by way of example solvents sold under the name Flexsorb®, inhibited MEA-based amine blends, enhanced solvents containing piperazine supplemented solvents or alkyl alkanolamines such as methyldiethanolamine (MDEA), 2-amino-2-methyl-1-propanol (AMP), specialty solvents such as but not limited to those sold under the name GAS/SPEC® and JEFFTREAT™, proprietary blends of additives and alkanolamines, sulfones such as Sulfolane, carbon capture specialty chemicals in all forms and compositions such as those sold under the name Selexol™, inhibited MEA-based amine blends as well as glycols such as monoethylene glycol (MEG), diethylene glycol (DEG), triethylene glycol (TEG), tetraethylene glycol (TTEG), and completion fluids such as high density monoethylene glycol (MEG) and propylene glycol (PEG), as well as halogenated solvents, liquid hydrocarbons including aromatic compounds, olefinic compounds, aliphatic compounds, water, and mixtures of water and other water-miscible materials, etc. Preferably, the processing liquids comprise amines, glycols, or sulfones utilized in gas production, gas processing/refining, or carbon capture applications. Further, a processing liquid as used herein refers to a liquid that is used in a particular process such that it becomes contaminated with, or at least after use contains, components not normally present in the processing liquid. Thus, the processing liquid can be a gas scrubbing medium used to remove undesirable contaminants from gas streams, a selective solvent to recover desirable components from gaseous or liquid streams, a medium used to treat solids to selectively remove certain components of the solids, etc.

Non-limiting examples of contaminants or components that may be present in the processing liquid and that need to be removed include acid gases such as hydrogen sulfide, carbon dioxide, sulfur oxides and more volatile liquid components such as water, liquid hydrocarbons, etc. Non-limiting examples of less volatile components or contaminants present in the processing liquid that need to be removed therefrom include inorganic salts such as alkali metal halides; iron salts; salts of organic acids; carbonates; and numerous other organic and inorganic components that are less volatile than the processing liquid and that are dissolved and/or suspended solutions in the process liquid or that are present in generally non-filterable form, e.g., colloidal suspensions. While generally speaking the less volatile component will be a dissolved and/or suspended solid or sludge, these latter being generally nonfilterable, it is to be understood that the less volatile component can comprise a liquid that is higher boiling than the processing liquid and that, because it is a liquid, would not normally cause fouling or solid buildup in the lines of the process but that, under certain conditions, can form solids or emulsions and therefore must be removed from the processing liquid. Further, such high boiling liquids may affect the operating efficiency of the processing liquid and therefore must be removed or at least have their concentration reduced in the processing liquid to maintain overall capacity and performance efficiency of the processing liquid.

As used herein, the term "feed stream" means a used processing liquid which contains water in an amount of 1 to 85 wt %, and one or more contaminants to be removed from the processing liquid. Thus, the feed stream, as used in the description that follows, refers to the material that is to be treated in accordance with the process of the present invention to reduce or substantially remove contaminants.

It will be understood by one skilled in the art that the embodiments described herein will include various valves, pumps, and other control mechanisms. Such valves, pumps, and control mechanisms are well known to those skilled in the art and in the interest of simplicity, are not described herein.

Components in the drawings which are essentially the same throughout or perform their same function throughout will use the same reference characters throughout.

Turning to FIG. 1, there is shown an embodiment of the process of the present invention. The feed stream is introduced via line 100 and passes through reclaiming system 105. In the embodiment of FIG. 1, there is a reclaiming system 105 which includes a charge pump 110, line 120, and a separation zone comprising a still or flash vessel 130 (hereinafter referred to as vessel 130), but it will be understood that the exact components of reclaiming system 105 can vary and that other separators/separation processes can be used. Heat in vessel 130 effects separation such that a light, overhead portion of the feed stream leaves heated separation vessel 130 via line 132 for further processing or customer use. The light, overhead portion comprises primarily processing liquid. The residuum of heated separation vessel 130 comprises a higher concentration of contaminants, e.g., dissolved or suspended solids, high boiling liquids, etc., and a smaller amount of processing liquid. The residuum is removed via line 140 and introduced into centrifuge 150. The centrifuge 150 of the present invention is a solids/liquid/liquid centrifuge, preferably a high rpm disc centrifuge, more preferably with a nitrogen purge system (not shown) such as a Westfalia Model SA 20-01-576 self-cleaning 3 phase separator. Centrifuge 150 separates the solids and heavy liquids from the lighter or clarified liquids. The solids and heavy liquid discharge is taken via line 160 and line 188 to a waste tank or other disposal system. The clarified liquid obtained from the centrifuge 150 is taken via line 154 and introduced back into the feed stream in line 100 as a clarified recycle stream. If desired, the clarified recycle stream can be heated prior to mixing with the feed in line 100 to form a heated clarified recycle stream. In such case, it will be understood that heat provided to vessel 130 could come, at least in part, from the heated clarified recycle stream. The clarified recycle stream (optionally heated) and the feed stream can be mixed using an inline mixer or the like (not shown) well known to those skilled in the art. As another option, the clarified liquid of centrifuge 150, or a portion thereof, can be sent via line 211 to line 132 and thereafter sent for further processing or to the customer for their use.

In a preferred embodiment, the clarified liquid from centrifuge 150 is taken by line 172 to surge tank 173 prior to recycling back to the feed stream in line 100 or sending it to line 132. Surge tank 173 provides a reservoir for the clarified liquid and allows the temperature to equalize so that the clarified liquid can be added to line 154 at a constant flow rate and temperature. This ensures stable operation of the reclaiming system 105. Surge tank 173 may also provide for further separation of fluids. As an optional feature, line 168 removes undesired fluids from surge tank 173 so that only desired or clarified fluid is transferred via line 154 or 211 to the next destination. It will be understood by those skilled in the art that depending on the respective densities of the components in the feed stream that the clarified fluid could be the upper, lower, or even a middle fraction in the surge tank 173. Thus, it is possible that removing clarified fluids could entail draining them from the bottom of the surge tank, while removing the undesired fluids from surge tank 173 could entail removing the upper fraction from the surge tank.

In a preferred embodiment, the residuum from vessel 130 is mixed with a diluent to improve its flow and/or reduce its temperature. The diluent can be a stream of feed stream. In this case, a slip stream 152 of feed stream is mixed with the residuum in line 140 prior to entering the centrifuge 150. Mixing can be accomplished with inline mixer 134 or other mixing device well known to those skilled in the art. In this embodiment, the mixture entering the centrifuge will be between 20% and 80% feed stream, more preferred between 30% and 60% feed stream and most preferred between 40% and 50% feed stream. In another embodiment the diluent is water. Line 196 is a water feed and can send water to various parts of the system as needed. A stream 158 of water is mixed by inline mixer 134 with the residuum in line 140. In this embodiment, the mixture entering the centrifuge will be between 10% and 70% water, more preferred between 20% and 50% water and most preferred between 30% and 40% water. In yet another embodiment, both feed stream and water can be mixed with residuum in line 140. The amounts of feed stream and water can be adjusted depending on the solids present in the residuum. Additionally, mixing the feed and/or water with the residuum will cool the residuum and help prevent overheating of the bearings and metal expansion in centrifuge 150.

Line 196 is a water feed and can send water to various parts of the system as needed. As discussed above, water can be added via line 158 to the residuum in line 140 for to dilute the residuum, adjust the temperature, control inlet solids concentrations, and rinse the solids of residual processing solution. Water can be added via line 164 directly into centrifuge 150 for temperature adjustments, to assist with flushing solids out of the centrifuge and/or to further dilute the residuum inside the centrifuge. Water can also be added via line 162 to the solids discharge to dilute it and improve its flow.

If desired, pre-treatment of the processing liquid feed stream can be accomplished by selectively introducing additives via line 178. Such additives adjust the pH of the feed stream, induce rapid solids formation for easier removal of the solids, and/or adjust phase densities of the feed stream. The pH of the feed stream is preferably greater than 9, more preferably greater than 10, even more preferably greater than 10.75, and most preferably greater than 11.75. Thus, the additives are preferably basic in nature to maintain the desired pH.

Examples of appropriate additives include alkali hydroxides, alkaline earth metal hydroxides, alkali carbonates, alkaline earth metal carbonates/bicarbonates, and mixtures thereof. The additives preferably include calcium hydroxide, magnesium hydroxide, sodium hydroxide, potassium hydroxide, calcium carbonate, magnesium carbonate, sodium carbonate, potassium carbonate, or mixtures thereof. In a preferred embodiment, the additives are an aqueous mixture comprising 2-40 wt % of a hydroxide and 1-10 wt % of a carbonate, more preferably 5-25 wt % of a hydroxide and 2-7 wt % of a carbonate most preferably 7-15 wt % of a hydroxide and 3-5 wt % of a carbonate.

The process of FIG. 1 also includes bypass line 170 in which the residuum from heated separation vessel 130 is simply discharged as waste. This provides the flexibility to handle different processing liquids which may not need additional centrifugation and allows for maintenance of the centrifuge without shutting down the entire process.

Figure 2:
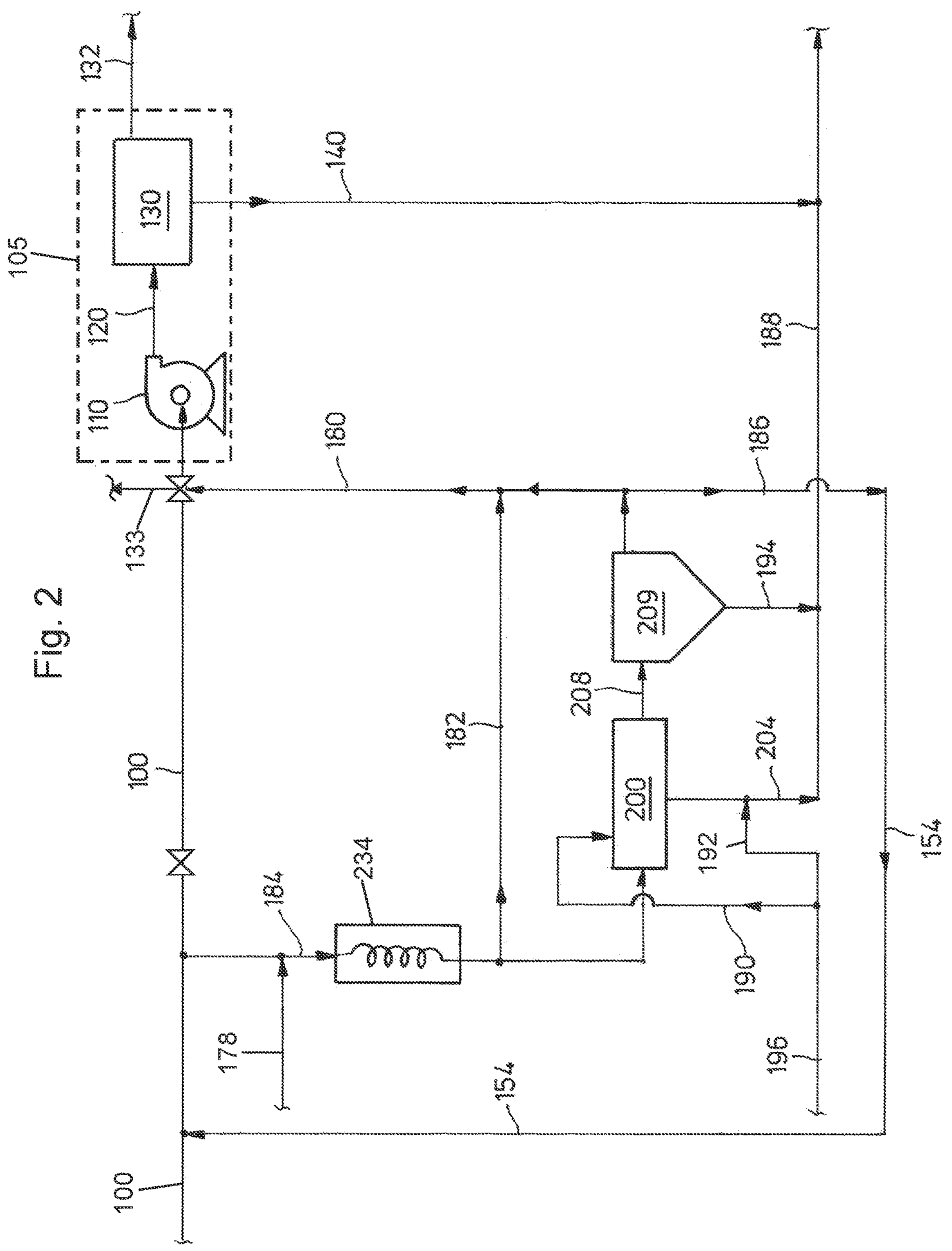
FIG. 2 is a schematic, flow diagram of another embodiment of the reclaiming process of the present invention.

Turning to FIG. 2 there is shown another embodiment of the present invention. The embodiment of FIG. 2 shows the inventive process can be employed as a pre-treatment step of a reclaiming process. In this embodiment, at least a portion of the feed stream 100 is sent via line 184 to centrifuge 200. The centrifuge 200 of the present invention is a solids/liquid/liquid centrifuge, preferably a high rpm disc centrifuge, more preferably with a nitrogen purge system (not shown). Centrifuge 200 separates the solids and undesired liquids from the desired or clarified liquids. The solids and undesired liquid discharge from centrifuge 200 is taken via line 204 and line 188 to a waste tank or other disposal system. The clarified liquid obtained from the centrifuge 200 is taken via line 208 to clarifier 209. It will be understood that the use of clarifier 209 is a preferred feature, but is not necessarily required. Similar to surge tank 173 in the embodiment of FIG. 1, clarifier 209 acts as a reservoir to control the flow of the clarified liquid to the downstream processes to ensure a stable operation and allows for even further separation within the clarifier. The clarified liquid obtained from clarifier 209 is taken by line 180 to reclaiming system 105 which operates in the same fashion described above with respect to FIG. 1. Line 194 removes undesired fluid from clarifier 209. It will be understood by those skilled in the art that depending on the respective densities of the components in the feed stream that the clarified fluid could be the upper, lower, or even a middle fraction in clarifier 209. Thus, it is possible that removing clarified fluids could entail draining them from the bottom of the clarifier, while removing the undesired fluids from clarifier 209 could entail removing the upper fraction from the surge tank.

As shown in FIG. 2, a portion of the clarified liquid stream from clarifier 209 can be sent via lines 186 and 154 back to feed stream in line 100. If desired, the clarified recycle stream can be heated prior to mixing with the feed in line 100 to form a heated clarified recycle stream. In such case, it will be understood that the heat provided to vessel 130 could come, at least in part, from the heated clarified recycle stream.

Line 196 is a water feed and can provide water to multiple locations. Water can be added to centrifuge 200 via line 190 for assisting with liquid/liquid separation, and flushing solids out of centrifuge 200. Water also can be added via line 192 to dilute the solid/thick liquid discharged from centrifuge and improve its flow.

If desired, pre-treatment of the processing liquid feed stream can be accomplished by selectively introducing additives via line 178. The additives can be mixed by inline mixer 234 or other mixing devices well known to those skilled in the art. Such additives adjust the pH of the feed stream, induce rapid solids formation for easier removal of the solids, and/or adjust phase densities of the feed stream. The pH of the feed stream is preferably greater than 9, more preferably greater than 10, even more preferably greater than 10.75, and most preferably greater than 11.75. Thus, the additives are preferably basic in nature to maintain the desired pH.

Examples of appropriate additives include alkali hydroxides, alkaline earth metal hydroxides, alkali carbonates, alkaline earth metal carbonates/bicarbonates, and mixtures thereof. The additives preferably include calcium hydroxide, magnesium hydroxide, sodium hydroxide, potassium hydroxide, calcium carbonate, magnesium carbonate, sodium carbonate, potassium carbonate, or mixtures thereof. In a preferred embodiment, the additives are an aqueous mixture comprising 2-40 wt % of a hydroxide and 1-10 wt % of a carbonate, more preferably 5-25 wt % of a hydroxide and 2-7 wt % of a carbonate most preferably 7-15 wt % of a hydroxide and 3-5 wt % of a carbonate.

The process of FIG. 2 has an option for bypassing centrifuge 200 if needed. Thus, the process depicted in FIG. 2, also allows for introducing additives via line 178 to pretreat the feed stream and then sending at least a portion of the pretreated feed stream via bypass line 182 into the reclaimer process without passing through centrifuge 200 and clarifier 209. Bypass line 182 thus allows for better customization of the feed stream entering the thermal reclaimer system 105.

The embodiment of FIG. 2 also includes bypass line 133 in which the clarified stream from centrifuge 200/clarifier 209 bypasses the reclaiming system 105 and is sent for other downstream processing or for customer use. This provides the flexibility to handle different processing liquids which may need a certain amount of treatment and separation but not necessarily a complete reclaiming. These bypass lines 182 and 133 make the system more flexible and save on energy costs by avoiding unnecessary processing steps.

Figure 3:
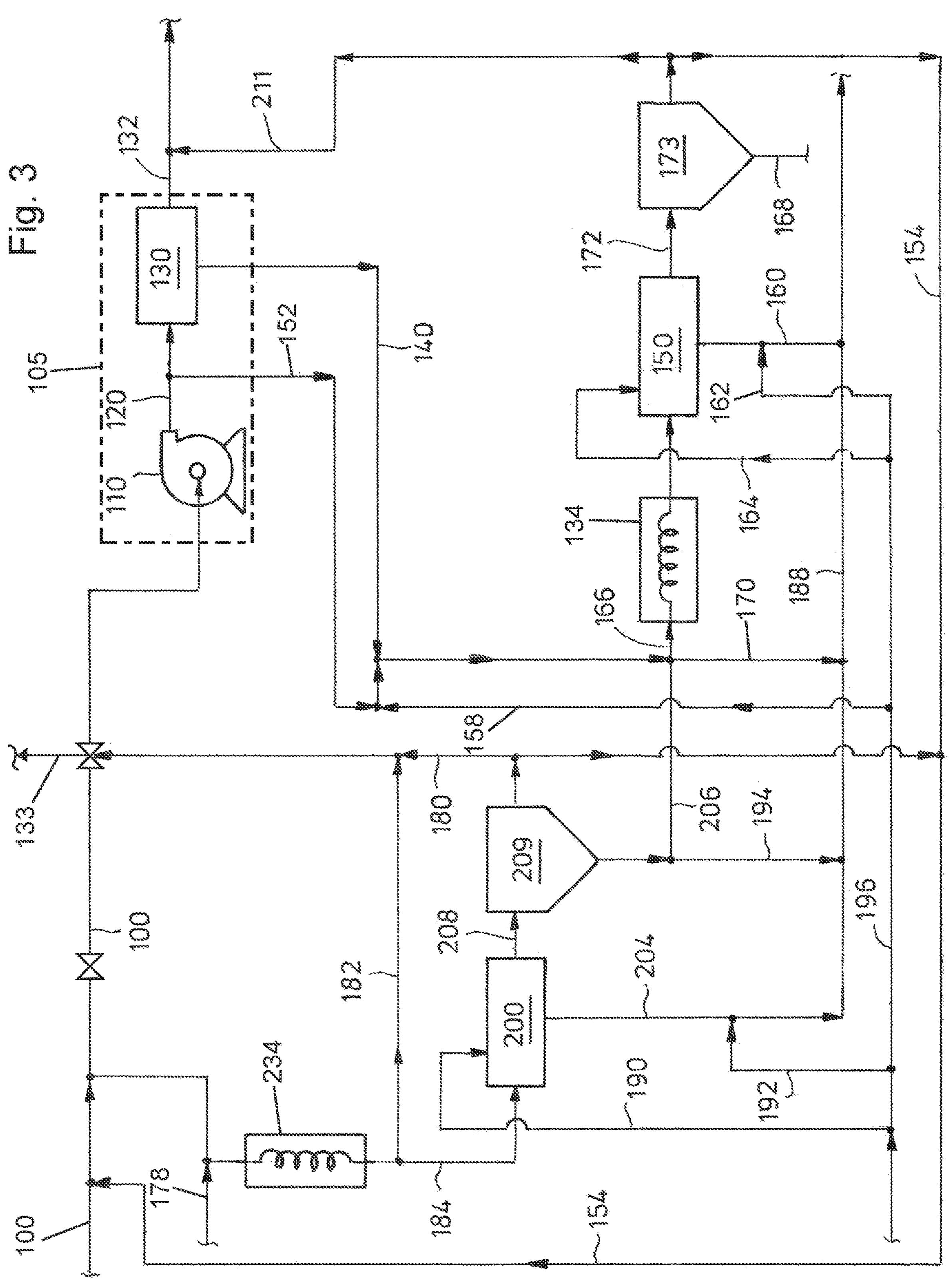
FIG. 3 is a schematic, flow diagram of a further embodiment of the reclaiming process of the present invention.

Turning to FIG. 3, there is shown another embodiment of the process of the present invention. At least a portion of the feed mixture 100 is sent vial line 184 to centrifuge 200. The clarified liquid from clarifier 209 is sent back to feed stream

100 where enters the reclaiming system 105 which operates as described above with respect to FIG. 1. The residuum of vessel 130 is sent via lines 140 and 166 to centrifuge 150. Diluents in the form of the feed stream and/or water can be mixed with the residuum prior to entering centrifuge 150. If the diluent is feed stream, then the mixture entering the centrifuge will be between 20% and 80% feed stream, more preferred between 30% and 60% feed stream and most preferred between 40% and 50% feed stream. If the diluent is water, then the mixture entering the centrifuge will be between 10% and 70% water, more preferred between 20% and 50% water and most preferred between 30% and 40% water.

If desired, pre-treatment of the processing liquid can be accomplished by selectively introducing additives via line 178. The additives can be mixed by inline mixer 234 or other mixing devices well known to those skilled in the art. Such additives adjust the pH of the feed stream, induce rapid solids formation for easier removal of the solids, and/or adjust phase densities of the feed stream. The pH of the feed stream is preferably greater than 9, more preferably greater than 10, even more preferably greater than 10.75, and most preferably greater than 11.75. Thus, the additives are preferably basic in nature to maintain the desired pH.

Examples of appropriate additives include alkali hydroxides, alkaline earth metal hydroxides, alkali carbonates, alkaline earth metal carbonates/bicarbonates, and mixtures thereof. The additives preferably include calcium hydroxide, magnesium hydroxide, sodium hydroxide, potassium hydroxide, calcium carbonate, magnesium carbonate, sodium carbonate, potassium carbonate, or mixtures thereof. In a preferred embodiment, the additives are an aqueous mixture comprising 2-40 wt % of a hydroxide and 1-10 wt % of a carbonate, more preferably 5-25 wt % of a hydroxide and 2-7 wt % of a carbonate most preferably 7-15 wt % of a hydroxide and 3-5 wt % of a carbonate.

An additional feature shown in FIG. 3 is the option of sending a portion of the undesired liquid discharge from clarifier 209 via line 206 to centrifuge 150 for further separation. The undesired liquid from clarifier 209 is mixed with the residuum from heated separation vessel 130 in inline mixer 134 or other mixing device well known to those skilled in the art.

The process of the present invention achieves a greater recovery of processing liquid. It has surprisingly been found that the process of the present invention can obtain complete separation of extremely fine particles, e.g., calcium carbonate fines, leaving a clear centrate. The process of the present invention can also desludge amines and other processing liquid streams. Typically, a "sludge" is a semi solid to partially crystallized stream which is typically quite difficult to efficiently separate from a stream.

The process of the present invention offers several advantages over the prior art. The solids/liquid/liquid separation process of the present invention can be used, as described above, to reduce solids in a bottoms recirculation stream. This allows for increased recovery of the processing liquid. The present invention can also be employed as a pre-treatment step as part of a reclaiming process or as a pre-treatment step combined with further treatment of the residuum from the reclaiming. As a pre-treatment step, it reduces the amount of solids/sludge entering the downstream reclaimer. Fewer solids enter the reclaimer, creating less of a burden on the reclamation system, and thus reducing wear and tear on the system. It also reduces product loss to the residuum streams. The present invention is a non-thermal method for improving the quality of processing liquids. The present invention allows the processing liquid recovery process to remain operational for longer periods of time before fluid levels must be adjusted or residues purged. Because the solids removal process of the present invention is non-thermal itself, there are low energy costs in implementing it, compared to thermal processes. The process of the present invention is continuous, automated process which is customizable to handle particular processing liquids, solids levels, and downstream processing steps.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

The invention claimed is:

1. A process for recovering a processing liquid from a feed stream, said process comprising:

providing a feed stream comprising processing liquid, from 1 to 85 wt % water, and dissolved solids;

adjusting the pH of said feed stream to a pH greater than 9 to induce formation of solids;

introducing at least a portion of said feed stream into a solids/liquids/liquids disc centrifuge to produce a discharge stream containing solids and a clarified stream;

introducing a first portion of said clarified stream into a reclaiming system to produce a stream comprising purified processing liquid and a residuum stream comprising solids;

recycling a second portion of said clarified stream to said feed stream; and introducing said clarified stream into a clarifier prior to recycling a second portion of said clarified stream.

2. The process of claim 1, wherein said pH is adjusted by introducing a pH adjusting additive having a basic pH.

3. The process of claim 2, wherein said pH adjusting additive comprises alkali hydroxides, alkaline earth metal hydroxides, alkali carbonates, alkaline earth metal carbonates, calcium hydroxide, magnesium hydroxide, sodium hydroxide, potassium hydroxide, calcium carbonate, magnesium carbonate, sodium carbonate, potassium carbonate, or mixtures thereof.

4. The process of claim 3, wherein said pH adjusting additive comprises an aqueous mixture comprising 2-40 wt % of a hydroxide and 1-10 wt % of a carbonate.

5. A process for recovering a processing liquid from a feed stream, said process comprising:

providing a feed stream comprising processing liquid, from 1 to 85 wt % water, and dissolved solids;

adjusting the pH of said feed stream to a pH greater than 9 to induce formation of solids;

introducing at least a portion of a feed stream into a first solids/liquids/liquids disc centrifuge to produce a first discharge stream containing solids and a first clarified stream;

introducing a first portion of said first clarified stream into a reclaiming system to produce a stream comprising purified processing liquid and a residuum stream comprising solids;

introducing at least a portion of said residuum stream into a second solids/liquids/liquids disc centrifuge to produce a second discharge stream containing solids and a second clarified stream;

recycling a second portion of said first clarified stream to said feed stream; and introducing said first clarified stream into a clarifier prior to recycling a second portion of said first clarified stream.

6. The process of claim 5, further comprising:

introducing a diluent into said residuum stream prior to introducing said residuum stream into said second centrifuge.

7. The process of claim 6, wherein said diluent comprises the feed stream.

8. The process of claim 5, wherein said pH is adjusted by introducing a pH adjusting additive having a basic pH.

9. The process of claim 8, wherein said pH adjusting additive comprises alkali hydroxides, alkaline earth metal hydroxides, alkali carbonates, alkaline earth metal carbonates, calcium hydroxide, magnesium hydroxide, sodium hydroxide, potassium hydroxide, calcium carbonate, magnesium carbonate, sodium carbonate, potassium carbonate, or mixtures thereof.

10. The process of claim 9, wherein the additives comprise an aqueous mixture comprising 2-40 wt % of a hydroxide and 1-10 wt % of a carbonate.

11. The process of claim 5, further comprising:

removing bottoms fluid from said clarifier and introducing it into said second centrifuge.

12. The process of claim 5, further comprising:

recycling at least a portion of said second clarified stream to said feed stream.

* * * * *